United States Patent
Yang et al.

(10) Patent No.: US 10,467,199 B2
(45) Date of Patent: Nov. 5, 2019

(54) DEFINITION METHOD FOR URBAN DYNAMIC SPATIAL STRUCTURE CIRCLE

(71) Applicant: SOUTHEAST UNIVERSITY, Nanjing (CN)

(72) Inventors: Junyan Yang, Nanjing (CN); Weiting Xiong, Nanjing (CN); Yi Shi, Nanjing (CN)

(73) Assignee: SOUTHEAST UNIVERSITY, Nanjing (CN)

( * ) Notice: Subject to any disclaimer, the term of this patent is extended or adjusted under 35 U.S.C. 154(b) by 172 days.

(21) Appl. No.: 15/529,196

(22) PCT Filed: May 9, 2016

(86) PCT No.: PCT/CN2016/081389
§ 371 (c)(1),
(2) Date: May 24, 2017

(87) PCT Pub. No.: WO2017/133110
PCT Pub. Date: Aug. 10, 2017

(65) Prior Publication Data
US 2018/0046652 A1    Feb. 15, 2018

(30) Foreign Application Priority Data

Feb. 2, 2016 (CN) .......................... 2016 1 0073733

(51) Int. Cl.
*G06F 16/20* (2019.01)
*H04W 4/02* (2018.01)
(Continued)

(52) U.S. Cl.
CPC .............. *G06F 16/20* (2019.01); *G06F 16/29* (2019.01); *H04W 4/025* (2013.01); *H04W 4/029* (2018.02)

(58) Field of Classification Search
CPC combination set(s) only.
See application file for complete search history.

(56) References Cited

U.S. PATENT DOCUMENTS

| | | | |
|---|---|---|---|
| 2011/0125468 A1* | 5/2011 | Fitzgerald | G16B 5/00 703/2 |
| 2013/0317944 A1* | 11/2013 | Huang | G01S 5/0252 705/26.61 |

(Continued)

FOREIGN PATENT DOCUMENTS

| CN | 102402728 A | 4/2012 |
|---|---|---|
| CN | 105184862 A | 12/2015 |

*Primary Examiner* — Shyue Jiunn Hwa
(74) *Attorney, Agent, or Firm* — CBM Patent Consulting, LLC (57) ABSTRACT

A definition method for urban dynamic spatial structure circle comprising steps of: collecting the location data of mobile phone users for cleaning and handling to obtain a matched location data of mobile phone user; incorporating the matched location data of mobile phone user at various moments into a daily location data of mobile phone according to the date with a base station being the unit; locating spatially each base station with different users in a whole city through Tyson polygon processing method addressing the incorporated base station information; distributing the data of user number in each polygon into each land plot contained therein; obtaining mobile phone user distribution multi-circle numerical law on each moment and workday and finding the critical point of value, delineating the urban dynamic spatial structure circle distribution map after combining the circles in the same plot area.

3 Claims, 6 Drawing Sheets

(51) Int. Cl.
*G06F 16/29* (2019.01)
*H04W 4/029* (2018.01)

(56) References Cited

U.S. PATENT DOCUMENTS

| | | | | |
|---|---|---|---|---|
| 2013/0321407 A1* | 12/2013 | Jenkins | ............... | G01V 1/345 345/419 |
| 2014/0156806 A1* | 6/2014 | Karpistsenko | .......... | G06F 16/25 709/219 |
| 2014/0350856 A1* | 11/2014 | Lambie | ............... | G01W 1/00 702/3 |
| 2018/0292339 A1* | 10/2018 | Gunzenhauser | ..... | A01B 79/005 |

* cited by examiner

DEFINITION METHOD FOR URBAN DYNAMIC SPATIAL STRUCTURE CIRCLE

This application is the U.S. national phase of International Application No. PCT/CN/2016/081389 filed on 9 May 2016 which designated the U.S. and claims priority to Chinese Application Nos. CN201610073733.7 filed on 2 Feb. 2016, the entire contents of each of which are hereby incorporated by reference.

TECHNICAL FIELD

The present invention relates to the field of information acquisition and processing technology of mobile phone signaling, in particular, to a processing and deconstruction method for urban dynamic spatial structure circle definition based on location data of mobile phone user.

BACKGROUND

The rapid development of information technology brings in "Big Data" era, which has altered urban spatial organization and innovated the research method for urban spatial structure. Conventional analysis for urban spatial structure originates from the material space and falls on the material space simultaneously. Since mobile phone signal big data under the information era can not only reflect the morphological situation of urban space directly and genuinely but also allow the research to originate from human and fall on space, so the research for urban space is not only limited to material space. Thus, in this Big Data era, research on urban spatial structure by using information data provides a new research direction and idea for existing researches on urban space, and poses a significant meaning on reconstructing and enriching the urban planning discipline theory, on directing urban planning and construction.

Until now, there are a lot of definitions for urban spatial structure circle in urban planning field, which is an important constituent part of planning practice for empirical analysis of each city. However, current definition method being mainly based on urban static spatial structure and being conducted mainly from static material space has a single applicable range and is difficult to track the dynamic urban structure. In summary, current definition for urban spatial structure circle is not suited for continuity analysis on dynamic spatial structure, and it has many drawbacks primarily comprising:
(1) preliminary survey costs a lot of manpower, material and financial resources, and conducts for a relatively long time period;
(2) since it costs too much and has a large time interval of survey, the data update may not reflect the actual situation of a city in time;
(3) inputting results from survey needs a heavy workload, at the same time, the accuracy and standardization may not remain uniform with a possibility of man-made error, so it can't support an optimized strategy of urban planning.

This method is commonly suited for circle analysis of urban static spatial structure, but hard to be continuous in the time dimension.

SUMMARY

Purpose of the invention: for the existing problem in prior art, the present invention provides a method for defining urban dynamic spatial structure circle based on mobile phone location data with a low cost, large sample size, high accuracy and strong time effectiveness.

Technical solution: To achieve the above object of the present invention, the following technical scheme is adopted in the present invention:

A definition method for urban dynamic spatial structure circle, characterized by comprising steps of:
(1) Collecting the location data of mobile phone user;
(2) Cleaning and processing of data: cleaning and filtering the location data of mobile phone user to eliminate the data with failing location and abnormal mutation, matching the location data of mobile phone user into the corresponding base station area according to the longitude and latitude coordinate of the location data of mobile phone user, and establishing an affiliation between the location data of mobile phone users and the base station area to obtain a matching location data of mobile phone user;
(3) Incorporating and counting the matching location data of mobile phone user at various moments according to time day with time day being the basis unit based on the matching location data of mobile phone users to obtain two research libraries with basic data of various moments and overall data of each time day;
(4) Matching base station with land plots data: based on the location data of mobile phone user within each time day or time point, distributing the number of mobile phone user in each base station into equal proportion according to the land area of land plots by using Tyson polygon technique, and statistically adding the number of users in each base station within the same land area with the land being the basic unit, then the location data of mobile phone users in different moments and time days within each land of the whole city may be acquired by processing the matching phone location data of all users according to above-mentioned method;
(5) Analysis of urban dynamic spatial structure in different moments: based on processed location data of mobile phone user that drop into land plots, inputting each land data into ArcGIS as a basic analysis database according to two dimension, namely each moment and each day, with the user number and density being the basic processing units, and then using Kriging interpolation method in ArcGis to analyze the spatial distribution trend of mobile phone user location number of each land plot within the whole city for a trend diagram of Urban population spatial structure distribution base circle at different moments and days, wherein, user density=user number in each land plot/plot base area;
Based on this illustration, abnormal value is excluded and manual detection is conducted to eliminate error for a more accurate circle delineation chart; meanwhile aligning spatially it with the whole land. After rectification and alignment, the urban dynamic structure analysis basis may be obtained.
(6) Identification of urban dynamic spatial structure circle: obtaining a value of distribution density of mobile phone users in each circle according to the distribution trend of mobile phone user number in each base circle in previous step, while statistically analyzing the change law of this value and calculating change trend proportion of user distribution density values of two adjacent circles to find the value point of inflection point therein, which is the delineating critical value of urban dynamic spatial structure circle;
(7) Input and analysis of urban dynamic spatial structure circle: Outputting the structure view of circle at each moment and each workday with visibility and vectorization in a dimensional view of ArcGIS to obtain the circle variation trend of urban dynamic spatial structure, and further analyzing comparatively to find the law of variation therein for predicting the future variation trend.

The collected data content in step (1) includes: information of anonymous encrypted mobile terminal ID, signaling time, service basic station when signal occurs etc., the data type includes: boot, shutdown, send text messages, receive text messages, calling, called, location update, cell switching, Internet access.

For the context in step (4) that those users on the road is difficult to count and identify, separating the user number of this part according to the center line of road into the land plot on two sides.

Beneficial effects: The present invention systematically solve the problem of the method for urban dynamic spatial structure circle utilizing location data of mobile phone user, having significant advantages of strong practicability, high algorithm efficiency, well-uniformed results etc., being able to drive the structural analysis of urban space to be more objective, genuine, lower costive, and being suited for application in each city with a wide prospect, specifically as follows:

1. Confronting rapid urbanization, timely monitoring is required to update the morphological changes of urban space for meeting the demand of urban planning, the present invention provides a new technical solution for defining the urban dynamic spatial structure circle, which takes advantage of mobile phone user location data in large samples with huge amount, tracks the evolution law of urban dynamic spatial circle by ArcGis spatial analysis through establishing continuous observation and monitoring mechanism, and is capable of embodying genuine urban spatial structure feature with human being the monitoring unit and reflecting genuinely the distribution of urban spatial structure circle with a high sample rate.
2. Data of the method for urban dynamic spatial structure circle based on location data of mobile phone user in the present invention originates from the location data of mobile phone user, and the data acquired with land being the basic unit includes total amount of users in each land, user density, overall spatial distribution trend, temporal and spatial distribution features etc., having a relatively low cost, taking advantage of mobile communication fundamental infrastructure and not requiring additional manpower investigation; automation is achieved by computer capturing and analyzing data; sample size is so large that it can almost cover the all urban area; the data updates in a short circle with a strong dynamic to achieve a more humane urban planning service.

DETAILED DESCRIPTION

The technical solution of the present invention will be described below in detail by combining definition examples on urban spatial structure circle based on the location data of mobile phone user in urban area of Shanghai (not including the three islands, namely Chongming Island, Changxing Township and Hengsha Township, and its spatial distribution covers the central urban area of Shanghai and peripheral new towns with an area of 6540 km$^2$) and figures.

Figure 1:
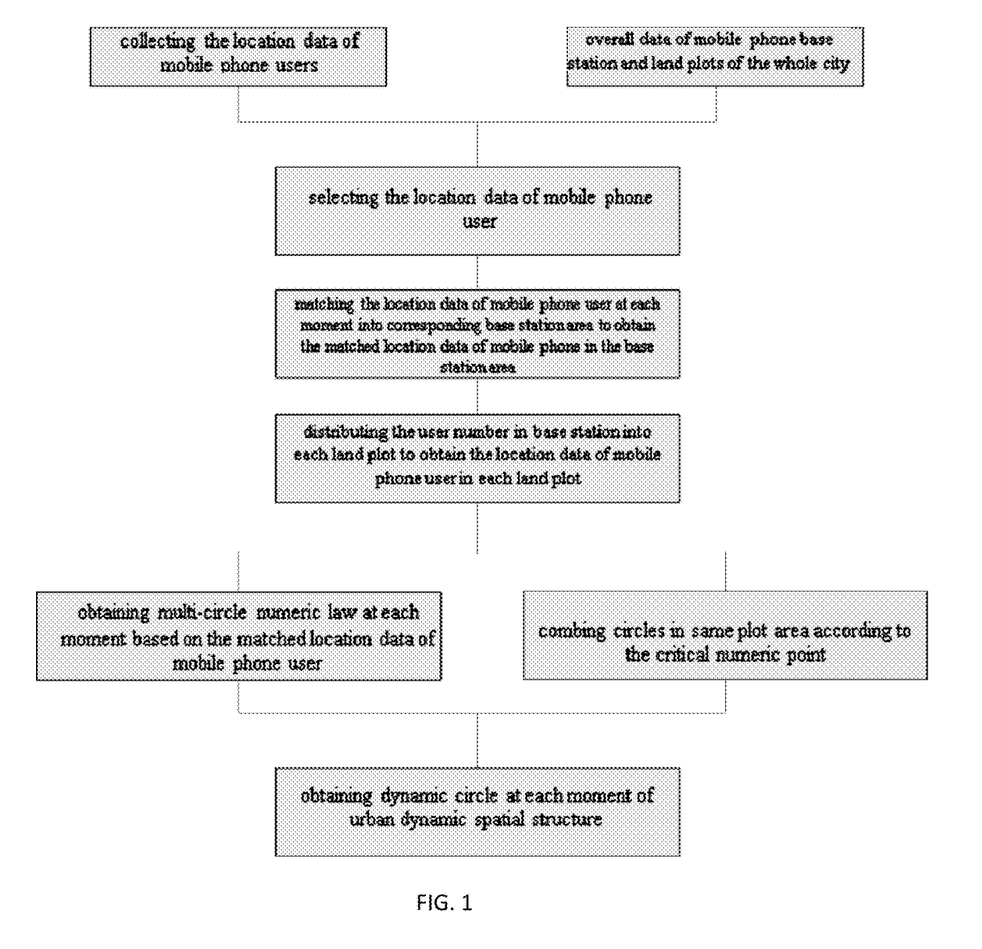
FIG. 1 is a flow chart showing the method of the present invention.

The definition method for urban dynamic spatial structure circle comprises steps of (FIG. 1):

(1) Collecting the location data of mobile phone user;

The mobile phone signal data selected by the present example is anonymous encrypted data with data content including: information of anonymous encrypted mobile terminal ID, signaling time, service base station when signal occurs etc. The data type includes: boot, shutdown, send text messages, receive text messages, calling, called, location updates, cell switching, Internet access etc. This data space lies in Shanghai area (16 districts and 1 county), the time ranges from 2012 to 2013 with total four typical workdays (Wednesday or Thursday), four typical weekends (Sunday) and a typical holiday, the daily data amount is 1.5 billion.

(2) Cleaning and processing of data

Cleaning and filtering the location data of mobile phone users to eliminate the data with failing location and abnormal mutation, matching the location data of mobile phone users into the corresponding base station area according to the longitude and latitude coordinate of the location data of mobile phone users, and establishing an affiliation between the location data of mobile phone users and the base station area to obtain a matching location data of mobile phone users.

(3) Incorporating and counting the matching location data of mobile phone users at various moments according to workday with workday being the basic unit based on the matched location data of mobile phone user to obtain two research libraries with basic data of various moments and overall data of each workday.

(4) Matching base station with land plot data

Figure 2:
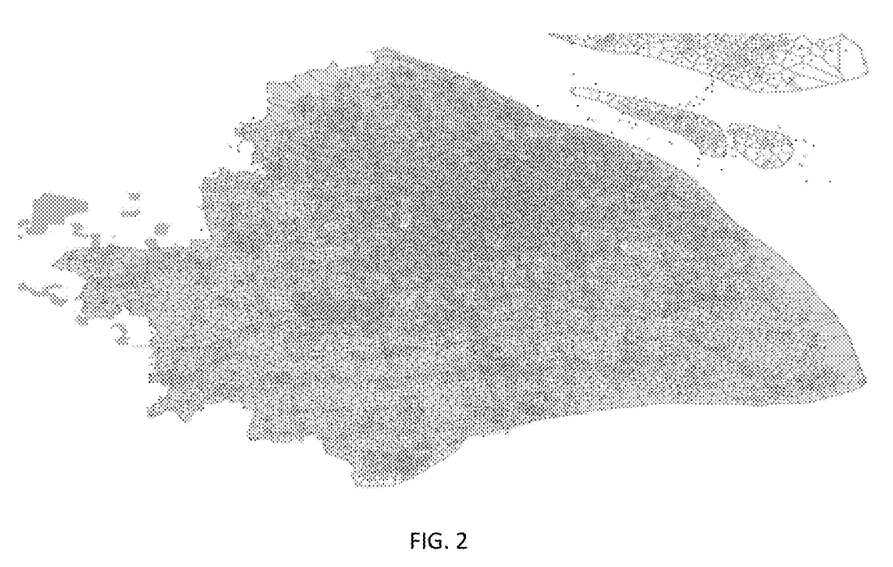
FIG. 2 is a base station distribution and signaling cell division of a communication service provider in Shanghai.
Figure 3:
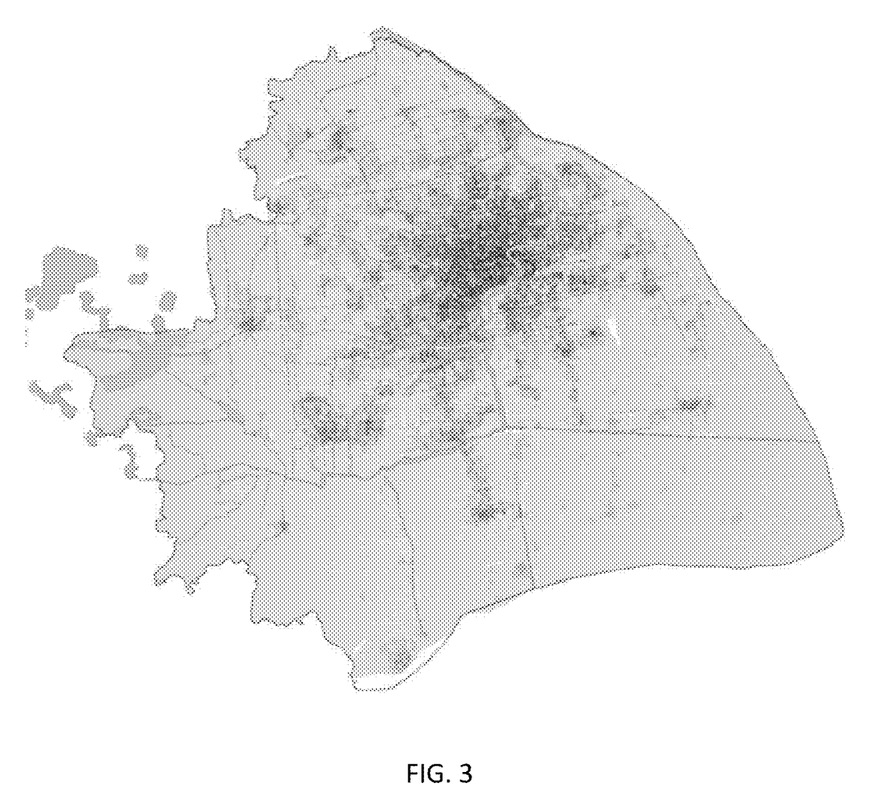
FIG. 3 is a distribution view of mobile phone user density of each land in Shanghai according to embodiments of the present invention.

Based on the location data of mobile phone users within each workday or moment in previous step, distributing the number of mobile phone users in each base station into equal proportion according to the land area of land plot by using Tyson polygon technique, and the deeper the color in this figure, the greater the density of the mobile phone user, and vice versa (FIG. 2). Wherein as those users on the road are difficult to count and identify, separating the user number of this part according to the center line of road into the land on two sides. Meanwhile, statistically summarizing the number of mobile phone user in each base station within the same land plot with the land plot being the basic unit (FIG. 3). Then the location data of mobile phone user at different moments and workdays within each land plot of the whole city may be acquired by processing the matched phone location data of all users according to above-mentioned method.

(5) Analysis of urban dynamic spatial structure in different moments

Based on processed location data of mobile phone user that fall into land plot, inputting each land plot data into ArcGIS as a basic analysis database according to two dimensions, namely each moment and each workday with the user number and density being the basic processing units.

Figure 4:
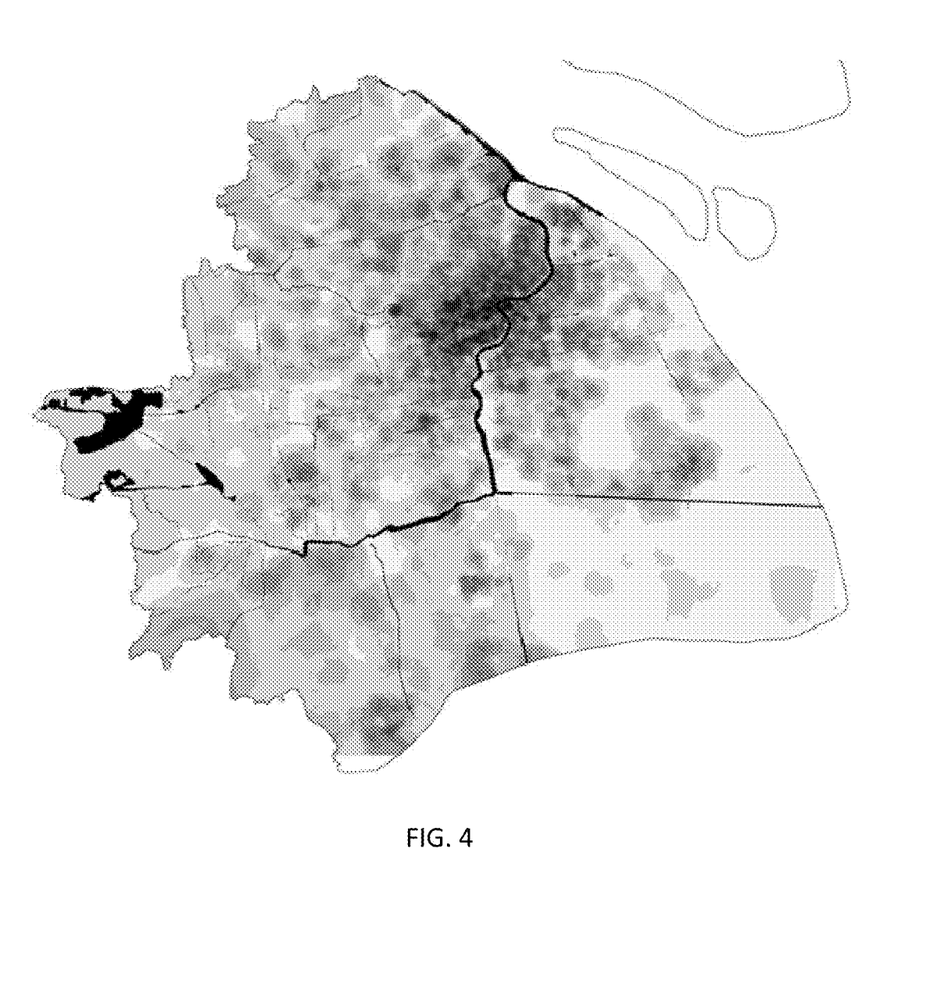
FIG. 4 is a circle trend distribution view of mobile phone user of each land in Shanghai according to embodiments of the present invention.

Wherein, user density=user number in each land/plot base area using Kriging interpolation method in ArcGis to analyze the spatial distribution trend of mobile phone user location number of each land plot within the whole city for a trend diagram of Urban population spatial structure distribution basic circle at different moments and workdays. In terms of Shanghai, 13 circles radiated from the urban center can be obtained (FIG. 4). In one aspect, abnormal value is excluded from this circle and manual detection on it is conducted to eliminate error for a more accurate circle delineation chart; meanwhile spatially aligning it to be a basis for urban dynamic structure analysis. This circle definition is also an important step for long-term relative practice of urban planning such as overall urban planning.

(6) Identification for urban dynamic spatial structure circle

Figure 5:
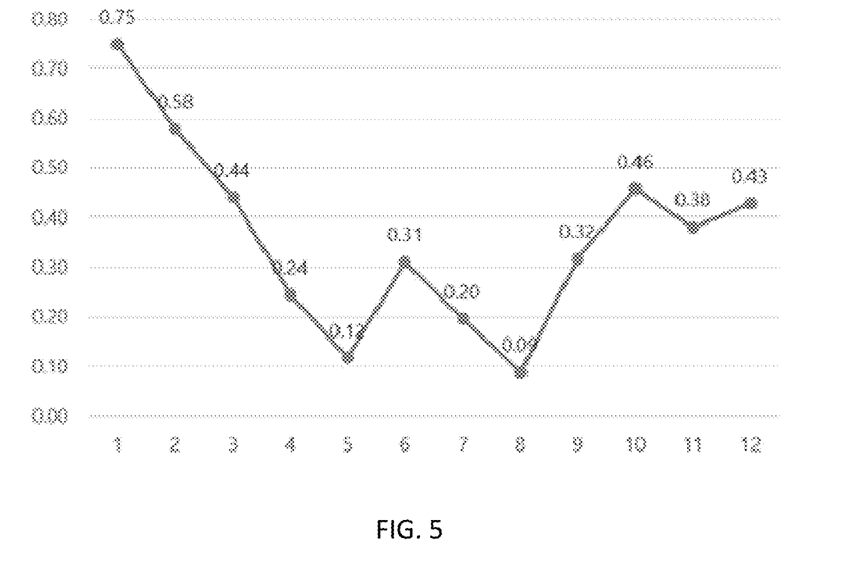
FIG. 5 is a view of critical value of urban spatial structure circle in Shanghai according to embodiments of the present invention.

Obtaining a value of distribution density of mobile phone user in each circle according to the distribution trend of mobile phone user number within each basic circle in previous step, while statistically analyzing the variation law of this value and calculating the change trend percentage of user distribution density values of two adjacent circles to find the value point of inflection point therein, which is the delineating critical value of urban dynamic spatial structure circle. In terms of Shanghai, there are 3 circle inflection point, so 4 circles has been identified (FIG. 5).

(7) Output and analysis of urban dynamic spatial structure circle

Figure 6:
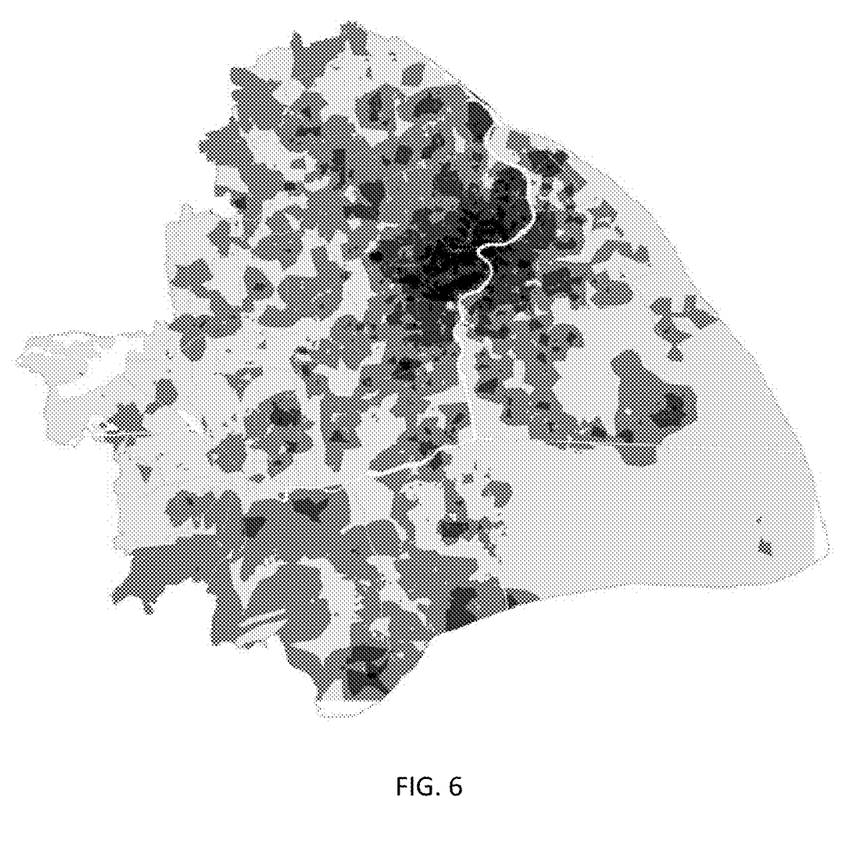
FIG. 6 is a delineation view of urban spatial structure final circle in Shanghai according to embodiments of the present invention.

Outputting the structure view of circle at each moment and each workday with visibility and vectorization in a dimensional view of ArcGIS for circles in four levels according to the color depth as shown in figure (FIG. 6) to obtain the circle variation trend of urban dynamic spatial structure, and further analyzing comparatively to find variation law therein for predicting the future variation trend.

What is claimed is:

1. A definition method for urban dynamic spatial structure circle, characterized by comprising steps of:
   (1) collecting the location data of mobile phone users;
   (2) cleaning and processing of data: cleaning and filtering the location data of mobile phone users to eliminate the data with failing location and abnormal mutation, matching the location data of mobile phone users into the corresponding base station area according to the longitude and latitude coordinate of the location data of mobile phone users, and establishing an affiliation between the location data of mobile phone users and the base station area to obtain a matching location data of mobile phone users;
   (3) incorporating and counting the matching location data of mobile phone user at various moments according to time day with time day being the basis unit based on the matching location data of mobile phone users to obtain two research libraries with basic data at various moments and overall data at each time day;
   (4) matching base station with land data: based on the location data of mobile phone user within each time day or time point, distributing the number of mobile phone user in each base station into equal proportion according to the land area by using Tyson polygon (Voronoi) generation algorithm technique, and statistically adding the number of user in each base station within same land area with the land being the basis unit, then the location data of mobile phone user in different moments and time days within each land of the whole city may be acquired by processing the matching phone location data of all users according to above-mentioned method;
   (5) analysis of urban dynamic spatial structure in different moments: based on processed location data of mobile phone on land, inputting each land data into ArcGIS (a platform for geographic information system) as a basic analysis database according to two dimensions of each time point and each time day with the user number and density being the basic processing units, and using Kriging (Gaussian process regression) interpolation method in ArcGis to analyze the spatial distribution trend of mobile phone user location number of each land within the whole city for trend diagram of urban population spatial structure distribution basic circle at different moments and time days, wherein, user density equals user number in each land/land base area;
   (6) identification of urban dynamic spatial structure circle: obtaining a value of distribution density of mobile phone user in each circle according to the distribution trend of mobile phone user number within each basic circle in previous step, while statistically analyzing the change law of value and calculating change trend proportion of user distribution density values of two adjacent circles to find the value point of inflection point therein, which is the delineating critical value of urban dynamic spatial structure circle;
   (7) input and analysis of urban dynamic spatial structure circle: inputting the structure view of circle at each moment and each time day with visibility and vectorization in a dimensional view of ArcGIS to obtain the circle change trend of urban dynamic spatial structure, and further analyzing comparatively to find change law therein for predicting the future change trend.

2. The definition method for urban dynamic spatial structure circle according to claim 1, wherein the collected data content in step (1) includes: information of anonymous encrypted mobile terminal ID, signaling time, service basic station when signal occurs, the data type includes: boot, shutdown, send text messages, receive text messages, callers, called, location updates, cell switching, Internet access.

3. The definition method for urban dynamic spatial structure circle according to claim 1, wherein users are difficult to be counted and identified on the road in step (4), dividing the user number according to the center line of road into the land on two sides.

* * * * *